Dec. 18, 1934.  R. W. BURNETT  1,984,517
HOLDING AND RELEASING MECHANISM FOR RAILWAY CAR HAND BRAKES
Original Filed Sept. 23, 1929   2 Sheets-Sheet 2
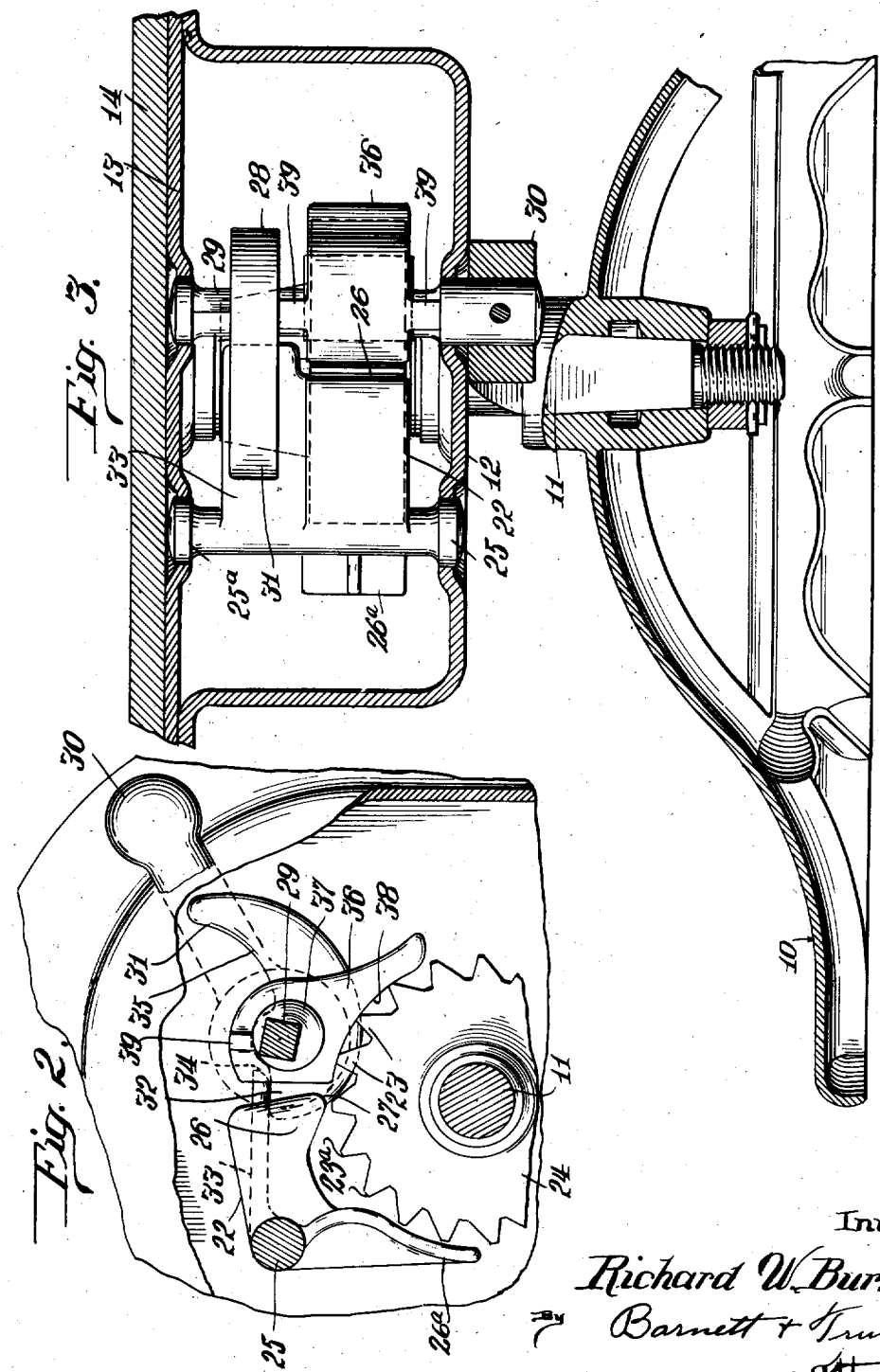
Inventor
Richard W. Burnett
By Barnett & Truman
Attorneys Patented Dec. 18, 1934

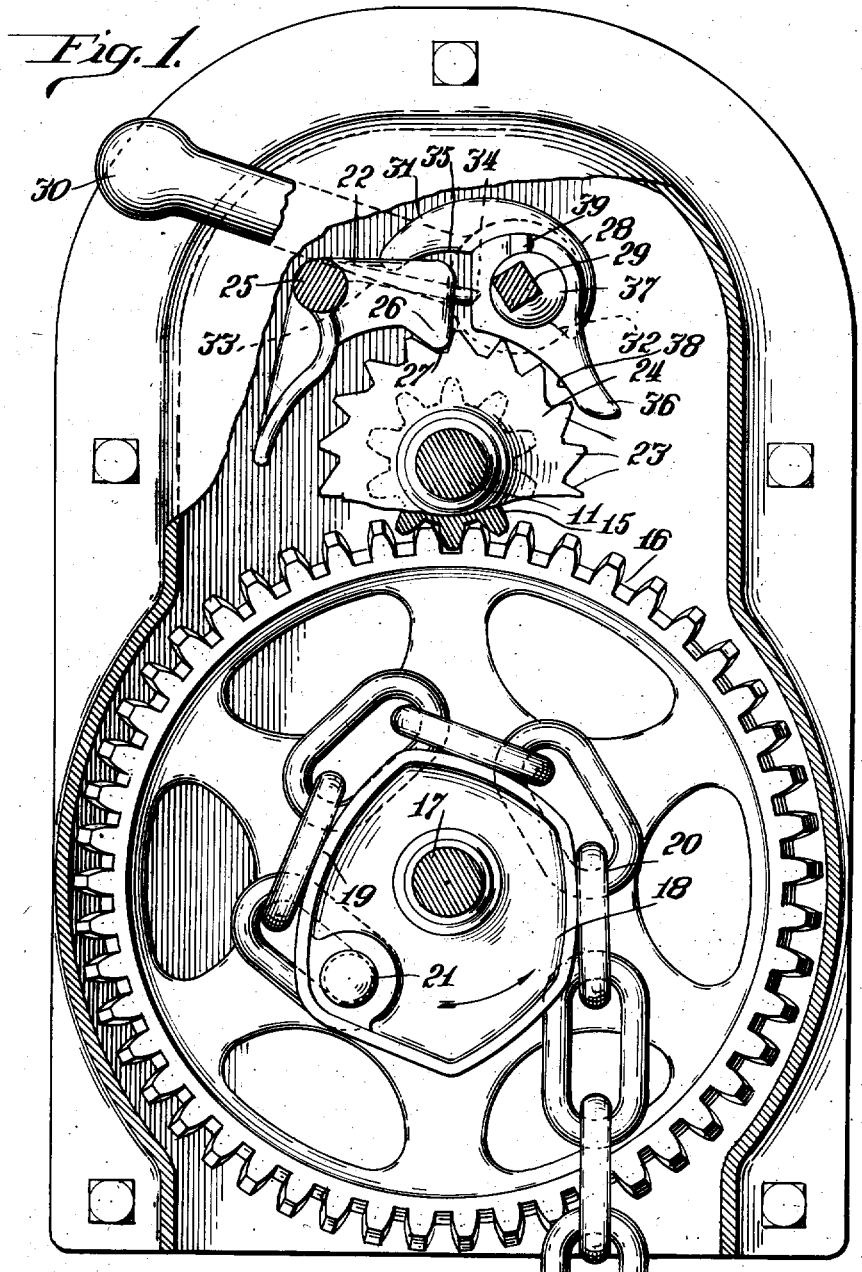

1,984,517

UNITED STATES PATENT OFFICE 1,984,517

HOLDING AND RELEASING MECHANISM FOR RAILWAY CAR HAND BRAKES

Richard W. Burnett, Chicago, Ill.

Original application September 23, 1929, Serial No. 394,670. Divided and this application February 11, 1932, Serial No. 592,371

8 Claims. (Cl. 188—81.1)

This invention relates to railway car hand brakes and particularly to improvements in means for holding the hand power mechanism of a railway car hand brake in and releasing it from its brake setting position.

The principal object of the invention is to provide improved means for releasibly holding the hand power mechanism in brake setting position which when disengaged to permit release of the brakes will be re-engaged to interrupt said releasing movement only under conditions which will avoid injuring the co-engaging holding members.

The invention also contemplates the provision of improved coengaging holding members which are so formed as to engage with each other to prevent reverse movement of the hand brake mechanism only when the members are in such position with relation to each other that the severe shocks incident to the interruption of reverse movements will be received by said coengaging members at a location having sufficient thickness of metal to avoid breaking.

The invention further contemplates as a specific embodiment of the invention a gravity operated pawl and ratchet wheel which is so formed as to prevent re-engagement of the holding pawl with the reversely moving ratchet wheel until the velocity of the reverse movement of said wheel is checked either by application of retarding pressure to a moving part of the brake mechanism or by avoiding re-engagement until the force of the reverse movement of the ratchet wheel has been substantially spent so as to permit the nose end of the pawl to drop to substantially its lowermost position between adjacent teeth of the ratchet wheel. One of the various constructions for attaining the above mentioned object is to form one of the co-engaging holding members with a suitably curved or a cam surface adapted to be engaged by the other member during the period in which the ratchet wheel rotates in a reverse direction at a high velocity and adapted to throw or move the pivoted holding pawl outwardly from the teeth of the ratchet until the velocity of the reverse movement of the ratchet is substantially reduced.

Further objects of the invention will be apparent from the detail description of the constructions and operations of the various parts of the embodiment of the hand brake shown in the accompanying drawings.

In the drawings:

Fig. 1 is a front view of a hand brake power mechanism showing my improved holding and releasing mechanism; the housing in which the hand power mechanism is mounted is broken away in this figure for purpose of clearness.

Fig. 2 is a fragmentary view of the holding and releasing mechanism showing the holding pawl and ratchet wheel in the position they assume during the releasing operation of the brake; and Fig. 3 is a plan view of the holding and releasing mechanism with the housing, hand wheel and parts of the trip lever shown in section.

The hand power mechanism herein shown comprises a hand wheel 10 supported on a shaft 11 which is suitably journaled in the front and back plates 12 and 13 of a housing for the gearing mechanism. The said housing is preferably secured to a vertical wall 14 of a railway car so that the hand wheel 10 rotates in a vertical plane. The shaft 11 is formed with a pinion 15 (Fig. 1) which meshes with a large gear 16. The large gear 16 is revolubly supported within the housing on a shaft 17. A winding drum 18 is cast integrally with the large gear 16 and is formed with a grooved winding surface 19 of eccentric contour about which a chain 20 or other suitable flexible connector is adapted to be wound. One end of the chain 20 is attached to the winding drum by means of a pin 21 and the other end of the chain is adapted to be connected to the brake rigging beneath the car (not shown) or to any suitable means for transmitting pulls on said chain to said brake rigging. The winding drum 18 is illustrated in Fig. 1 of the drawings in the position which the said drum assumes when the brakes of the car are fully set.

In setting the brakes, assuming the brakes are in released position, the brakeman grasps the hand wheel and rotates it in the direction indicated by the arrow in Fig. 3. This operation of the hand wheel imparts movement to the drum 18 in a direction to wind the chain thereon in the manner indicated in Fig. 1 and consequently exerts a brake setting pull on the brake rigging beneath the car.

The winding mechanism is held against reverse movement by means of a pawl 22 positioned to engage the teeth 23 of the ratchet wheel 24, the latter of which is preferably formed integrally with the pinion 15 and shaft 11. The pawl 22 is formed preferably with trunnion 25—25a which are suitably journaled in the said front and back plates of the gear housing. The tooth end 26 of the pawl is preferably weighted so that it will normally fall by gravity into engagement with the teeth of the ratchet wheel, whereby the co-engaging members 22—24 will hold the hand brake power mechanism against reverse movement.

In order to avoid chipping or otherwise damaging the teeth of the said co-engaging members 22—24 when they move into holding relation, one of said co-engaging members is so formed as to prevent movement of said members into holding relation under conditions likely to cause such injury. Such construction preferably consists in forming one of said co-engaging members with a cam surface adapted to be engaged by the other whereby the reverse movement of the ratchet wheel 24, when operating above a pre-determined velocity, will cause the tooth 26 of the holding pawl 22 to move upwardly and away from the teeth 23 of the ratchet wheel until the velocity of the ratchet wheel decreases. This result is obtained in the present embodiment by rounding the lower end of the pawl tooth 26 as indicated at 27. The curved surface 27 at the end of the pawl tooth serves as a cam which when engaged by the upper edge 23ᵃ of one of the teeth 23 of the ratchet wheel, moves the said tooth end 26 of the pawl upwardly and away from the teeth of the ratchet wheel and consequently prevents holding engagement between the pawl and the ratchet wheel. In order to prevent overthrow of the pawl while it is thus being thrown upwardly by engagement with the ratchet teeth or when it is ratcheting over the teeth of the ratchet wheel during the brake setting operation, it is provided with a tail portion 26ᵃ adapted to engage the ratchet wheel or other suitable stop to limit the upward movement of the tooth end of the pawl. The tail portion 26ᵃ of the pawl is preferably so positioned relative to the ratchet wheel that there is a slight clearance between the said tail portion and ratchet wheel when the tooth end 26 of the pawl is disengaged from the ratchet wheel as shown in Fig. 2 of the drawings.

The tooth end of the pawl is preferably lifted out of its holding position by means of a cam member 28 fixed to a shaft 29 and adapted to be rotated from one position to another by means of a trip lever 30 secured to the shaft 29 and positioned between the hand wheel 10 and the front plate 12 of the mechanism housing, as shown in Fig. 3 of the drawings. The cam member 28 is formed preferably with a long arm 31 and a short arm 32. The long arm 31 of the cam, in one position of the tripping lever 30 (Fig. 1) bears down on the pawl 22 at a point near the pivotal axis of the pawl so that the ratcheting movement of the pawl over the teeth of the ratchet wheel will no impart objectionable oscillations to the trip lever 30 during the brake setting operation or when the tooth 26 of said pawl is thrown upwardly by engagement with the teeth of the reversely moving ratchet wheel as above described. The long arm 31 preferably bears on a lateral flange 33 formed on one side of the pawl 22. The short arm 32 is positioned to engage the under surface of the lateral flange 33 at a point near the outer end of the pawl so that when the trip lever 30 is moved from the position shown in Fig. 1 to the position shown in Fig. 2, the said short arm will bear against the under surface of the flange 33 and support the pawl out of holding position. Preferably the flange 33 is formed at its end with a curved surface 34 which is engaged by the short arm 32 of the tripping cam when the lever 30 is moved to a position to bring the said short arm 32 into engagement with the flange 33 but before the pawl is lifted out of its holding position. The under surface of the long arm 31 is preferably curved upwardly as indicated at 35 to provide suitable clearance between the under surface of said arm and the end of the lateral flange 33, thereby permitting the pawl 22 to move upwardly without imparting any substantial oscillation to the tripping lever when the latter is in the position indicated in Fig. 1. It will be seen from the foregoing description that when the lever 30 is in the position indicated in Fig. 1, the weight of the lever serves as additional weight to maintain the holding pawl 22 in its holding position. That is to say, in a position to prevent movement of the brake winding mechanism in the direction to release the braking pressure and that in moving the trip lever 30 from the position indicated in Fig. 1 to the position indicated in Fig. 2 the short arm 32 of the cam is brought into engagement with the rounded end portion of the lateral flange of the pawl to lift the tooth end 26 of the pawl out of engagement with the ratchet teeth and consequently permit the winding mechanism to move in a reverse direction. In order to avoid violent spinning of the hand wheel when the brakes are released from their fully set position and to also provide means whereby the velocity of the reversely moving ratchet wheel may be retarded so as to permit the tooth end of the pawl to be returned to its holding position even though the brakes are only partially released, that is to say, to permit the brakes to be released from their fully set position by a step by step operation under the control of the brakeman, I provide a retarding member 36 adapted to be pressed against a moving part of the winding mechanism, preferably, though not necessarily, against the teeth of the ratchet wheel, when the trip lever 30 is moved a slight distance beyond that required to disengage the tooth of the pawl from its holding position. The retarding member 36 is preferably in the form of a shoe pivotally supported on an eccentric portion 37 of the shaft 29. The loose pivotal connection of the shoe with the eccentric portion 37 of the shaft makes it possible to bring the curved under surface 38 of the shoe flat against the periphery of the ratchet wheel and thereby insures engagement with a relatively large frictional surface and avoids wear at one part only of the shoe, such as would be the case if the shoe were supported on a fixed pivot. Furthermore the pivotal arrangement of the shoe together with the eccentric shaft 37 insures a perfect fit of the friction surface 38 against the ratchet teeth without requiring the said surface of the shoe to be machined. The eccentric construction of the shaft 29, in addition to insuring a uniform bearing of the surface 38 of the shoe against the ratchet teeth, provides for the exertion of great frictional force against the ratchet by a continued swinging movement of the tripping lever in a direction to disengage the pawl 22 from the ratchet teeth. The hub portion of the retarding shoe is formed with spacing lugs 39—39 which hold the friction shoe in a position to bear against the ratchet teeth. The portion of the hub of the shoe adjacent the end of the pawl 22 is preferably cut away to provide sufficient space for the rocking movement of the pawl. The arrangement and proportions of the various elements of the holding and releasing mechanism are such that when the tooth 26 of the pawl 22 is disengaged from the teeth of the ratchet wheel, further swinging movement of the tripping lever 30 will move the friction surface 38 of the retarding shoe into frictional engagement with the teeth of the ratchet wheel. This pressure of the shoe against the ratchet wheel is normally insufficient to provide any substantial friction, but great friction can be produced by applying pressure to the outer end of the trip lever 30 when it is in the position indicated in Fig. 2 of the drawings.

*Summary of operation.*—It will be observed that movement of the top part of the hand wheel in the direction indicated by the arrow in Fig. 3, that is to say in a clockwise movement with reference to Fig. 1, imparts movement to the winding drum in the direction indicated by the arrows to wind the chain about the drum as indicated in Fig. 1. During this brake setting operation the tooth end 26 of the pawl 22 rides over the ratchet teeth 23 of the ratchet wheel 24 falling into holding engagement with the ratchet teeth to prevent reverse movement of the winding mechanism. The pawl tooth 26 is lifted out of its holding position by means of the trip lever 30 which moves from the position indicated in Fig. 1 to the position indicated in Fig. 2. The curved lower end 27 of the pawl tooth 26 provides a cam surface which, when engaged by the upper edge 23ª of the teeth of the ratchet wheel, during the reverse movement of the latter, throws the tooth end of the pawl upwardly and away from the ratchet wheel so as to avoid re-engagement until the velocity of the ratchet wheel is decreased. The mechanism provides however for effecting a step by step release, that is to say, provides for the returning of the holding pawl to its holding position even though the brakes are but slightly released from their fully set position. This is accomplished by first retarding the reverse movement of the ratchet wheel by forcing the retarding shoe 36 against the ratchet wheel and then by quick movement of the lever 30 permits the tooth end 26 of the pawl to drop into holding position before the reverse movement of the ratchet wheel has attained such velocity as to prevent reengagement of the pawl in its holding position in the manner previously described. In any event it will be seen that the tooth of the holding pawl will not move into holding engagement with the teeth until the end 27 of the pawl has moved a substantial distance below the upper edges of the teeth of the ratchet wheel.

This application is a division of my copending application Serial No. 394,670, filed September 23, 1929, now Patent No. 1,950,477, issued Mar. 13, 1934.

I claim:

1. In hand brakes for railway cars, the combination with hand power mechanism operable in one direction to set the brakes, of means for holding the power mechanism in and releasing it from its brake setting position comprising a ratchet wheel operable with the power mechanism, a pawl pivoted to engage with the teeth of the ratchet wheel, and tripping means for lifting the pawl out of its holding position; said pawl being formed with a tooth curved to provide a cam portion adapted, during reverse movement of said ratchet above a predetermined velocity, to be engaged and moved upwardly by the teeth of the ratchet wheel so as to prevent re-engagement of said pawl and ratchet in holding position.

2. In hand brakes for railway cars, the combination with hand power mechanism operable in one direction to set the brakes, of means for holding the said power mechanism in and releasing it from its brake setting position comprising a ratchet wheel operable with the hand power mechanism, a holding pawl pivoted to drop by gravity into holding engagement with the teeth of said ratchet wheel to prevent reverse movement thereof; said pawl being formed with a rounded nose portion to provide a cam surface adapted, during reverse movement of the ratchet wheel above a predetermined velocity to be engaged and moved upwardly by the teeth of the ratchet wheel to prevent the pawl from dropping into holding engagement therewith until the reverse movement of the ratchet wheel decreases to said predetermined velocity.

3. In hand brakes for railway cars, the combination with hand power mechanism operable in one direction to set the brakes, of means for releasably holding the hand power mechanism against reverse movement comprising a ratchet wheel and a pivoted pawl one of which is formed with a cam surface adapted, by engagement with the other during reverse movement of the hand power mechanism at high velocity, to prevent reengagement of said pawl in holding position with said ratchet wheel during such high velocity movements of the hand power mechanism.

4. In hand brakes for railway cars, the combination with hand power mechanism operable in one direction to set the brakes, of means for releasably holding the hand power mechanism against reverse movement comprising coengaging holding members including a ratchet wheel operable with the power mechanism, and a pawl pivoted above said ratchet wheel and adapted to drop by gravity into holding engagement therewith to hold the hand power mechanism against reverse movement, one of said holding members being formed with a cam surface adapted, by engagement with the other member during reverse movement of the hand power mechanism at high velocity, to prevent reengagement of said pawl and ratchet wheel in holding position during such high velocity movement of the hand power mechanism.

5. In hand brakes for railway cars, the combination with hand power mechanism operable in one direction to set the brakes, of means for releasably holding the hand power mechanism against reverse movement comprising coengaging holding members one of which is formed with a cam surface adapted by engagement of the other member to prevent reengagement of said holding members in holding relation while the hand power mechanism moves in a reversed direction at a high velocity, a tripping lever for disengaging said holding member to permit such reverse movement of said hand power mechanism, and retarding means movable into frictional engagement with a moving part of the power mechanism to retard the speed of said reverse movement and thereby permit said coengaging holding members to move into holding relation with each other.

6. In hand brakes for railway cars, the combination with hand power mechanism operable in one direction to set the brakes, of means for releasably holding the hand power mechanism against reverse movement comprising coengaging holding members one of which is formed with a cam surface adapted by engagement with the other to prevent reengagement of said holding members in holding relation while the hand power mechanism moves reversely at a high velocity, a tripping lever for disengaging said holding members to permit such reverse movement of said hand power mechanism, and retarding means operable by said tripping lever and movable into frictional engagement with a moving part of the power mechanism to retard the speed thereof so as to permit said coengaging holding members to move into holding relation with each other.

7. In hand brakes for railway cars, the combination with hand power mechanism operable in one direction to set the brakes, of means for releasably holding the hand power mechanism against reverse movement comprising co-engaging holding members one of which is formed with a cam surface adapted by engagement with the other to prevent reengagement of the said holding members in holding relation while the hand power mechanism moves reversely at a high velocity, a tripping lever for disengaging said holding members to permit such reverse movement of said hand power mechanism, and means having a loose pivoted relation with said trip lever and movable into frictional engagement with a moving part of the power mechanism to retard the speed of said reverse movement and thereby permit said coengaging holding members to move into holding relation with each other.

8. In hand brakes for railway cars, the combination with hand power mechanism operable in one direction to set the brakes and operable in the reverse direction during the releasing movement thereof, of means for holding the power mechanism in and releasing it from its brake setting position comprising coengaging holding members, one of which has a fixed relation to a moving part of the power mechanism so as to move therewith, and a trip member for disengaging said holding members from each other to permit reverse movement of the power mechanism, one of said holding members being formed with a cam surface adapted to be engaged by the other of said holding members during rapid reverse movement of the said hand power mechanism and thereby prevent movement of said holding members into holding engagement with each other during such rapid reverse movement of said power mechanism.

RICHARD W. BURNETT.

CERTIFICATE OF CORRECTION.

Patent No. 1,984,517.      December 18, 1934.

RICHARD W. BURNETT.

It is hereby certified that error appears in the printed specification of the above numbered patent requiring correction as follows: Page 2, first column, line 55, for "no" read not; and page 4, first column, line 20, claim 7, for "pivoted" read pivotal; and that the said Letters Patent should be read with these corrections therein that the same may conform to the record of the case in the Patent Office.

Signed and sealed this 12th day of February, A. D. 1935.

Leslie Frazer
Acting Commissioner of Patents.

(Seal)

hand power mechanism, and retarding means operable by said tripping lever and movable into frictional engagement with a moving part of the power mechanism to retard the speed thereof so as to permit said coengaging holding members to move into holding relation with each other.

7. In hand brakes for railway cars, the combination with hand power mechanism operable in one direction to set the brakes, of means for releasably holding the hand power mechanism against reverse movement comprising co-engaging holding members one of which is formed with a cam surface adapted by engagement with the other to prevent reengagement of the said holding members in holding relation while the hand power mechanism moves reversely at a high velocity, a tripping lever for disengaging said holding members to permit such reverse movement of said hand power mechanism, and means having a loose pivoted relation with said trip lever and movable into frictional engagement with a moving part of the power mechanism to retard the speed of said reverse movement and thereby permit said coengaging holding members to move into holding relation with each other.

8. In hand brakes for railway cars, the combination with hand power mechanism operable in one direction to set the brakes and operable in the reverse direction during the releasing movement thereof, of means for holding the power mechanism in and releasing it from its brake setting position comprising coengaging holding members, one of which has a fixed relation to a moving part of the power mechanism so as to move therewith, and a trip member for disengaging said holding members from each other to permit reverse movement of the power mechanism, one of said holding members being formed with a cam surface adapted to be engaged by the other of said holding members during rapid reverse movement of the said hand power mechanism and thereby prevent movement of said holding members into holding engagement with each other during such rapid reverse movement of said power mechanism.

RICHARD W. BURNETT.

CERTIFICATE OF CORRECTION.

Patent No. 1,984,517.    December 18, 1934.

RICHARD W. BURNETT.

It is hereby certified that error appears in the printed specification of the above numbered patent requiring correction as follows: Page 2, first column, line 55, for "no" read not; and page 4, first column, line 20, claim 7, for "pivoted" read pivotal; and that the said Letters Patent should be read with these corrections therein that the same may conform to the record of the case in the Patent Office.

Signed and sealed this 12th day of February, A. D. 1935.

Leslie Frazer
Acting Commissioner of Patents.

(Seal)